(12) United States Patent
Okuyama et al.

(10) Patent No.: US 11,511,475 B2
(45) Date of Patent: \*Nov. 29, 2022

(54) METHOD OF MANUFACTURING LIQUID CONTAINER

(71) Applicant: YOSHINO KOGYOSHO CO., LTD., Tokyo (JP)

(72) Inventors: Yuichi Okuyama, Tokyo (JP); Hideaki Hoshino, Tokyo (JP); Mitsuru Shiokawa, Tokyo (JP); Kenichi Suyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 16/957,147

(22) PCT Filed: Oct. 25, 2018

(86) PCT No.: PCT/JP2018/039779
§ 371 (c)(1),
(2) Date: Jun. 23, 2020

(87) PCT Pub. No.: WO2019/130781
PCT Pub. Date: Jul. 4, 2019

(65) Prior Publication Data
US 2020/0346390 A1    Nov. 5, 2020

(30) Foreign Application Priority Data
Dec. 28, 2017  (JP) .............................. JP2017-254576

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B29C 2049/4294* (2013.01); *B29C 2049/4664* (2013.01); *B29L 2031/7158* (2013.01)

(58) Field of Classification Search
None
See application file for complete search history.

(56) References Cited

U.S. PATENT DOCUMENTS 10,940,631 B2 \* 3/2021 Okuyama ............... B29C 49/12
2015/0110915 A1    4/2015 Tamura et al.
(Continued)

FOREIGN PATENT DOCUMENTS

CN    107073797 A    8/2017
EP     2987612 A1    2/2016
(Continued)

OTHER PUBLICATIONS

Jul. 7, 2021 Office Action issued in Chinese Patent Application No. 201880083460.1.
(Continued)

*Primary Examiner* — Robert J Grun
(74) *Attorney, Agent, or Firm* — Oliff PLC (57) ABSTRACT

A method of manufacturing a liquid container, in which, a nozzle unit includes a blow nozzle having a supply port and a spare supply tube having, at a lower end thereof, a spare supply port. The method includes: an air exhausting step of exhausting the air in the preform to the outside by supplying a liquid into the preform from the spare supply port located at a bottom portion of the preform; a liquid blow molding step of molding the preform into a liquid container by supplying a pressurized liquid from the supply port into the (Continued)

preform; and a headspace forming step of forming a headspace by exhausting the liquid from the inside of the liquid container.

12 Claims, 9 Drawing Sheets

(51) Int. Cl.
*B29C 49/42* (2006.01)
*B29L 31/00* (2006.01)

(56) References Cited

U.S. PATENT DOCUMENTS

| 2016/0052654 A1 | 2/2016 | Voth et al. |
| 2017/0217077 A1 | 8/2017 | Suyama et al. |
| 2019/0118452 A1 | 4/2019 | Suzuki et al. |

FOREIGN PATENT DOCUMENTS

| JP | H05-64834 A | 3/1993 |
| JP | 2000-43129 A | 2/2000 |
| JP | 2013-208839 A | 10/2013 |
| JP | 5806929 B2 | 11/2015 |
| WO | 2016/017152 A1 | 2/2016 |
| WO | 2017/187698 A1 | 11/2017 |

OTHER PUBLICATIONS

Dec. 25, 2018 International Search Report issued in International Patent Application No. PCT/JP2018/039779.
Jun. 30, 2020 International Preliminary Report on Patentability issued in International Patent Application No. PCT/JP2018/039779.
Aug. 27, 2021 Search Report issued in European Patent Application No. 18893494.7.

* cited by examiner

METHOD OF MANUFACTURING LIQUID CONTAINER

TECHNICAL FIELD

The present disclosure relates to a method of manufacturing a liquid container that contains a content liquid from a preform.

BACKGROUND

Synthetic resin containers, representative examples of which including polypropylene (PP) bottles and polyethylene terephthalate (PET) bottles, are used to contain, as content liquids, various liquids such as beverages, cosmetics, medicines, detergents and toiletries such as shampoos. Such containers are generally manufactured by blow molding a preform formed of a thermoplastic synthetic resin material described above.

As a blow molding for molding a preform into a container, a liquid blow molding is known, in which, as a pressure medium supplied into a preform, a pressurized liquid is used instead of pressurized air.

For example, Patent Literature (PTL) 1 discloses a liquid blow molding method in which a synthetic resin preform heated in advance to a temperature at which stretchability is achieved is placed in a mold for blow molding, and a liquid pressurized to a predetermined pressure by a pressurizing means such as a pump is supplied into the preform through a blow nozzle. In this manner the preform is molded into a container of a predetermined shape conforming to a cavity of the mold.

According to the liquid blow molding method described above, as a liquid supplied into a preform, a content liquid contained finally in a container as a product is used, and molding of a container and filling of a content liquid into the container are performed at the same time, thus a liquid container containing a content liquid can be manufactured. Therefore, according to a method of manufacturing a liquid container in which a liquid blow molding is used as described above, a step of filling a content liquid into a container after molding is omitted, and a liquid container can be manufactured at a low cost.

CITATION LIST

Patent Literature

PTL 1: JP5806929 (B2)

SUMMARY

Technical Problem

In the above described existing liquid blow molding method, usually, it is required to form a headspace of a desired size in a container after molding. As a method of forming a headspace, for example, immediately after a liquid container is molded, a liquid inside the container is sucked by a pump through a blow nozzle so that the inside of the container is put in a negative pressure, then the inside of the container is released to the atmosphere to introduce the air into the container. In this manner a headspace is formed. However, the liquid existing in the container immediately after molding is in a state where it entrains the air existing in the preform. Therefore, in the above described method, the liquid entraining the air is introduced into a liquid supply channel connected to a blow nozzle. Thus, the air enters the supply channel and stability of the molding conditions and moldability of the container may decrease.

The present disclosure has been conceived in view of the above described problem, and it is an object of the present disclosure to provide a method of manufacturing a liquid container in which a liquid container can be manufactured precisely and at a low cost so that is has a predetermined content volume and a shape.

Solution to Problem

A disclosed method of manufacturing a liquid container is a method of manufacturing a liquid container containing a content liquid from a preform of a bottomed tubular shaped by using a nozzle unit and a mold. The nozzle unit includes a blow nozzle having a liquid supply port and a spare supply tube having, at the lower end thereof, a spare supply port for liquid. The method includes: an air exhausting step of exhausting the air inside the preform to the outside by supplying a liquid into the preform from the spare supply port located at the bottom of the preform; a liquid blow molding step of molding the preform into the liquid container of a shape conforming to an inner surface of the mold by supplying a pressurized liquid into the preform from the supply port; and a headspace forming step of forming a headspace in the liquid container by exhausting the liquid from the inside of the liquid container.

In the disclosed method of manufacturing a liquid container configured in the above described manner, preferably, in the headspace forming step, a headspace is formed by exhausting a liquid from the inside of the liquid container through the spare supply port located at the bottom of the liquid container.

In the disclosed method of manufacturing a liquid container configured in the above described manner, preferably, the nozzle unit has a seal body configured to open/close a supply channel terminating at the supply port and a spare seal body configured to open/close the spare supply port; the spare supply tube passes through the seal body and is displaceable relative to the seal body; the air exhausting step is performed with the supply channel closed with the seal body; the liquid blow molding step is performed with the supply channel opened with the seal body; and the headspace forming step is performed with the supply channel closed with the seal body.

In the disclosed method of manufacturing a liquid container configured in the above described manner, preferably, a stretching rod is configured by the spare supply tube and the spare seal body, and the method further includes a rod stretching step of axially stretching the preform by the stretching rod with the spare supply port closed during or before the liquid blow molding step.

In the disclosed method of manufacturing a liquid container configured in the above described manner, preferably, the nozzle unit has a pressurized liquid supply source connected to both of the supply port and the spare supply port, the air exhausting step is performed by operating the pressurized liquid supply source in a pressurizing direction, the liquid blow molding step is performed by operating the pressurized liquid supply source in the pressurizing direction, and the headspace forming step is performed by operating the pressurized liquid supply source in a sucking direction.

Advantageous Effect

According to the present disclosure, a method of manufacturing a liquid container is provided, in which a liquid container can be manufactured precisely and at a low cost so that it has a predetermined content volume and a shape.

DETAILED DESCRIPTION

The present disclosure will be described in more detail below with reference to the drawings.

Figure 1:
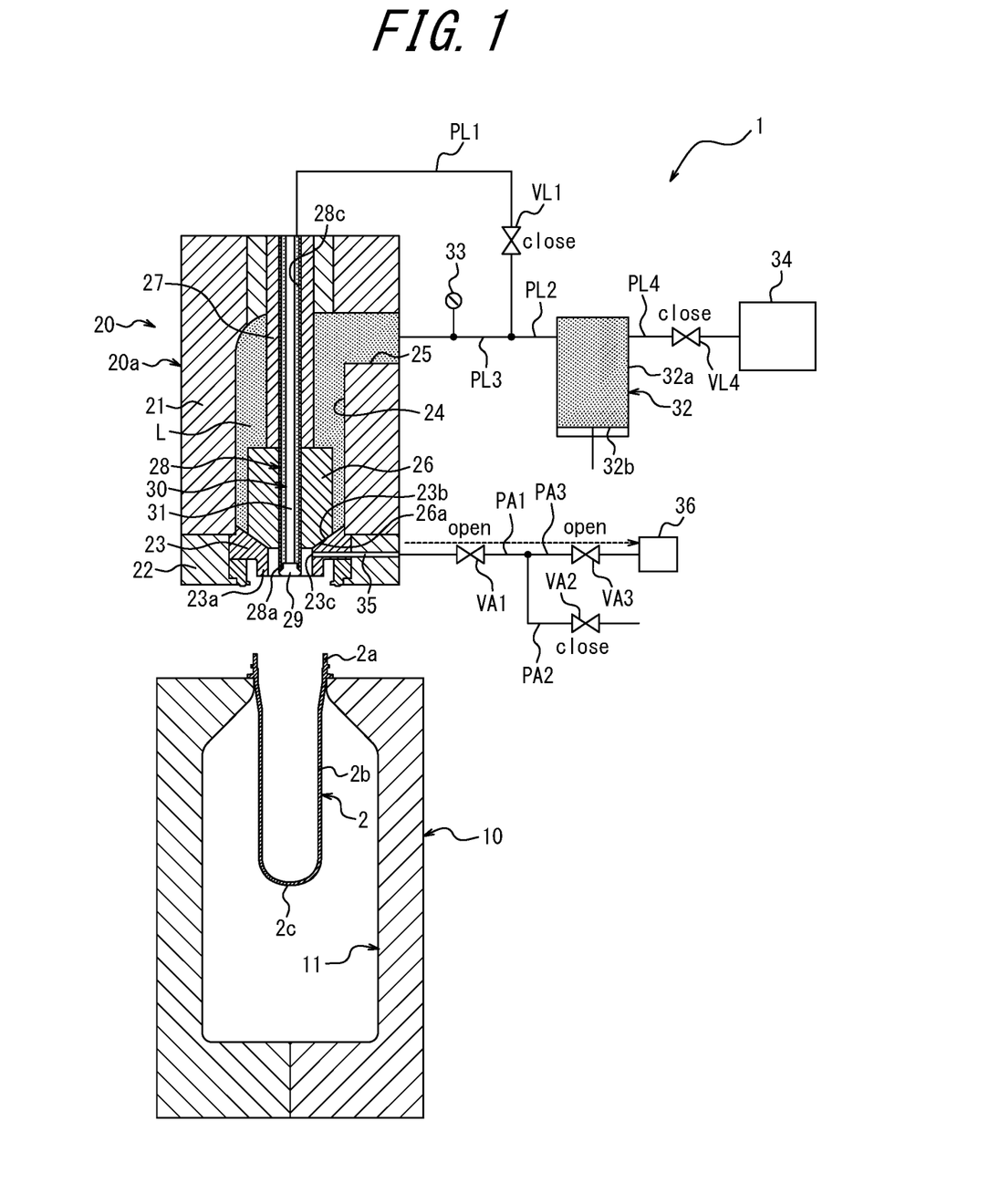
FIG. 1 is a diagram illustrating an example of a liquid container manufacturing apparatus used for a method of manufacturing a liquid container according to an embodiment of the present disclosure during a standby step.

The method of manufacturing a liquid container according to an embodiment of the present disclosure can be performed by using a liquid container manufacturing apparatus 1 configured as illustrated in FIG. 1, for example.

The liquid container manufacturing apparatus 1 illustrated in FIG. 1 manufactures a liquid container C (see FIG. 8) that contains a content liquid from a synthetic resin preform 2. As a liquid (content liquid) L contained in the liquid container C, a variety of liquids such as, for example, beverages, cosmetics, medicines, detergents and toiletries such as shampoos can be used.

As the preform 2, those formed by a thermoplastic synthetic resin material such as polypropylene (PP) and polyethylene terephthalate (PET), for example, into a bottomed tubular shape having a cylindrical mouth portion 2a, which is an open end, a cylindrical body portion 2b continuing to the mouth portion 2a, and a bottom portion 2c that closes the lower end of the body portion 2b can be used.

Although not illustrated in detail, on the outer wall surface of the mouth portion 2a is provided with an engaging protrusion configured to mount a plug cap (not illustrated) to the mouth portion 2a of the liquid container C after molding by plugging (undercut engagement). It is to be noted that, instead of the engaging protrusion, a male thread may be provided to the outer wall surface of the mouth portion 2a so as to mount the plug cap to the mouth portion 2a through thread connection.

The liquid container manufacturing apparatus 1 has a mold 10 for blow molding. The mold 10 has a cavity 11 of a shape corresponding to a final shape of a liquid container C, such as a bottle shape, for example. The cavity 11 opens upward on the upper surface of the mold 10. The preform 2 is placed in the mold 10 with the body portion 2b and the bottom portion 2c disposed inside the cavity 11 of the mold 10 and with the mouth portion 2a protruded upward from the mold 10.

The mold 10 can be opened right and left, and after the preform 2 is molded into a liquid container C, the liquid container C can be ejected from the mold 10 by opening the mold 10 right and left.

Above the mold 10 is provided with a nozzle unit 20 configured to supply a pressurized liquid L into the preform 2. The nozzle unit 20 has a main body block 21.

The lower end of the main body block 21 is provided with a support block 22, and a blow nozzle 23 is mounted to the lower end of the main body block 21 by being supported by the support block 22. The blow nozzle 23 is formed into a substantially cylindrical shape, and the lower end thereof is a supply port 23a for the liquid L. A nozzle unit main body 20a is configured by the main body block 21, the support block 22 and the blow nozzle 23. The nozzle unit main body 20a is displaceable relative to the mold 10 in the vertical direction. When the nozzle unit main body 20a is lowered to the stroke end on the lower side, the nozzle unit main body 20a (more specifically, the blow nozzle 23) is engaged hermetically, from above, with the mouth portion 2a of the preform 2 placed in the mold 1.

Inside the nozzle unit main body 20a (more specifically, the main body block 21 and the blow nozzle 23) is provided with a longitudinal channel 24 that terminates at the supply port 23a of the blow nozzle 23. The longitudinal channel 24 extends in the vertical direction. In this embodiment, the supply channel terminating at the supply port 23a of the liquid L is configured by the longitudinal channel 24, a supply port 25, a third liquid pipe PL3 and a second liquid pipe PL2 described later. That is, both of the end of the supply channel and the end of the longitudinal channel 24 are the supply port 23a.

The nozzle unit main body 20a (more specifically, the main body block 21) is provided with the supply port 25 that communicates with the upper end of the longitudinal channel 24.

A downward conical seal surface 23b is provided on the upper surface of the blow nozzle 23. The shape of the seal surface 23b can be appropriately changed. The seal surface 23b may be configured by an inner periphery of the blow nozzle 23 or of an upper surface and an inner periphery of the blow nozzle 23. Inside the longitudinal channel 24 is provided with a seal body 26 that can be seated on the seal surface 23b. The seal body 26 is formed into a cylindrical shape, and the lower end of the seal body 26 is provided with a downward conical tapered surface 26a. It is to be noted that the arrangement and the shape of the tapered surface 26a can be appropriately changed. When the seal body 26 is displaced to the closed position, which is a stroke end position on the lower side, it is seated on the seal surface 23b of the tapered surface 26a and closes the longitudinal channel 24. On the other hand, when the seal body 26 is displaced upward from the close position, the tapered surface 26a of the seal body 26 is separated from the seal surface 23b and the longitudinal channel 24 is opened.

As illustrated in FIG. 1, the seal body 26 is fixed to the shaft body 27 provided displaceable in the vertical direction relative to the nozzle unit main body 20a, and is displaceable in the longitudinal channel 24 in the vertical direction. The seal body 26 may be formed integrally with the shaft body 27.

Figure 9A:
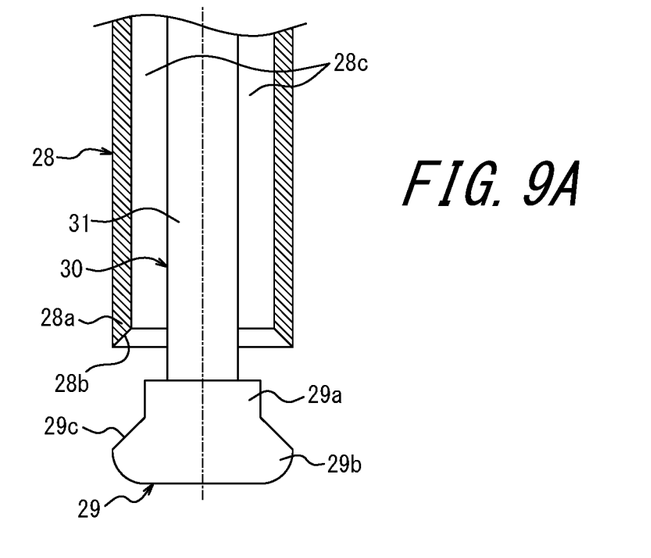
FIG. 9A is a diagram illustrating the liquid container manufacturing apparatus with a spare supply port opened.
Figure 9B:
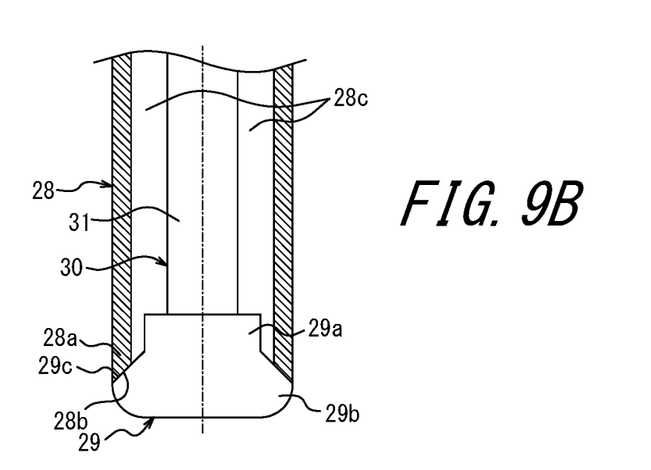
FIG. 9B is a diagram illustrating the liquid container manufacturing apparatus with the spare supply port closed.

The nozzle unit 20 has a spare supply tube 28 that has a spare supply port 28a for the liquid L. The spare supply tube 28 formed by steel and the like into a cylindrical shape passes through the seal body 26 and extends along an axial center of the seal body 26 and of the shaft body 27. As illustrated in FIGS. 9A to 9B, the spare supply port 28a is formed by the lower end of the spare supply tube 28 (the spare supply port 28a opens downward). An upward conical spare seal surface 28b is provided on the lower surface of the spare supply port 28a. However, the shape and the arrangement of the spare seal surface 28b can be appropriately changed.

Further, the nozzle unit 20 has a spare supply rod 30 having, on the lower end thereof, a spare seal body 29 configured to open/close the spare supply port 28a. The spare seal body 29 is fixed to the lower end of a columnar rod shaft body 31. However, the spare seal body 29 may be formed integrally with the rod shaft body 31. The spare supply rod 30 is configured by the spare seal body 29 and the rod shaft body 31. The spare seal body 29 has a columnar fixing portion 29a (see FIGS. 9A and 9B) fixed to the rod shaft body 31 by screwing, for example, and an annular flange 29b projecting from the outer periphery of the fixing portion 29a. On the upper surface of the flange 29b is provided with an upward conical spare tapered surface 29c. However, the shape and the arrangement of the spare tapered surface 29c can be appropriately changed. The flange 29b has an outer diameter of the same dimension as that of the spare supply tube 28. However, the dimension and the shape of the spare seal body 29 can be appropriately changed.

Each of the spare supply tube 28 and the spare supply rod 30 can be displaced relative to the seal body 26 in the vertical direction. The spare supply tube 28 and the spare supply rod 30 are driven individually or in cooperation with each other by a drive source not illustrated.

The spare supply tube 28 and the spare supply rod 30 (spare seal body 29) are used as a stretching rod that is displaced downward to axially stretch the preform 2. However, the spare supply tube 28 and the spare supply rod 30 may not be used as a stretching rod, or only the spare supply rod 30 may be used as a stretching rod.

The spare supply port 28a is connected to one end of the first liquid pipe PL1 through an intra-tube channel 28c formed by a hollow part of the spare supply tube 28. A first liquid pipe PL1 is provided with a first liquid pipe valve VL1 and thereby the first liquid pipe PL1 can be opened/closed. The first liquid pipe valve VL1 is configured by a solenoid valve, and is controlled to be opened/closed by a control means not illustrated. The other end of the first liquid pipe PL1 is connected to a pressurized liquid supply source 32 through a second liquid pipe PL2. The pressurized liquid supply source 32 can be configured by a plunger pump that includes a cylinder 32a and a piston (plunger) 32b, for example.

The other end of the first liquid pipe PL1 is also connected to the supply port 25 through a third liquid pipe PL3. The third liquid pipe PL3 is provided with a pressure gauge 33, and measurement data of the pressure gauge 33 is input to the control means.

In this manner, the pressurized liquid supply source 32 is connected to a supply channel configured by the longitudinal channel 24 terminating at the supply port 23a, the supply port 25, the third liquid pipe PL3 and the second liquid pipe PL2. Further, the pressurized liquid supply source 32 is connected to the spare supply port 28a through the intra-tube channel 28c, the first liquid pipe PL1 and the second liquid pipe PL2.

The pressurized liquid supply source 32 is connected to a tank 34 through a fourth liquid pipe PL4. The tank 34 can be configured to contain the liquid L and to heat the liquid L up to a predetermined temperature and hold the liquid L at the temperature. The fourth liquid pipe PL4 is provided with a fourth liquid pipe valve VL4, and the fourth liquid pipe PL4 can be opened/closed by the fourth liquid pipe valve VL4. The fourth liquid pipe valve VL4 is configured by a solenoid valve, and is controlled to be opened/closed by the control means.

The inner periphery of the blow nozzle 23 is provided with an exhaust port 23c configured to exhaust the air from the inside of the preform 2. Further, inside the blow nozzle 23 and the support block 22 is provided with an exhaust passage 35, and one end of the exhaust passage 35 terminates at the exhaust port 23c. In this embodiment, the exhaust passage 35 extends in the horizontal direction. However, the shape of the exhaust passage 35 can be appropriately changed. The other end of the exhaust passage 35 is connected with one end of a second air pipe PA2 through a first air pipe PA1 The other end of the second air pipe PA2 is released to the atmosphere. One end of the second air pipe PA2 is connected with a suction source 36 through a third air pipe PA3. The suction source 36 may be configured by a suction pump, for example. The first to third air pipes PA1 to PA3 are provided with the first to third air pipe valves VA1 to VA3, respectively, and the first to third air pipes PA1 to PA3 can be opened/closed by the first to third air pipe valves VA1 to VA3. Each of the first to third air pipe valves VA1 to VA3 is configured by a solenoid valve, and is controlled to be opened/closed by the control means.

Figure 2:
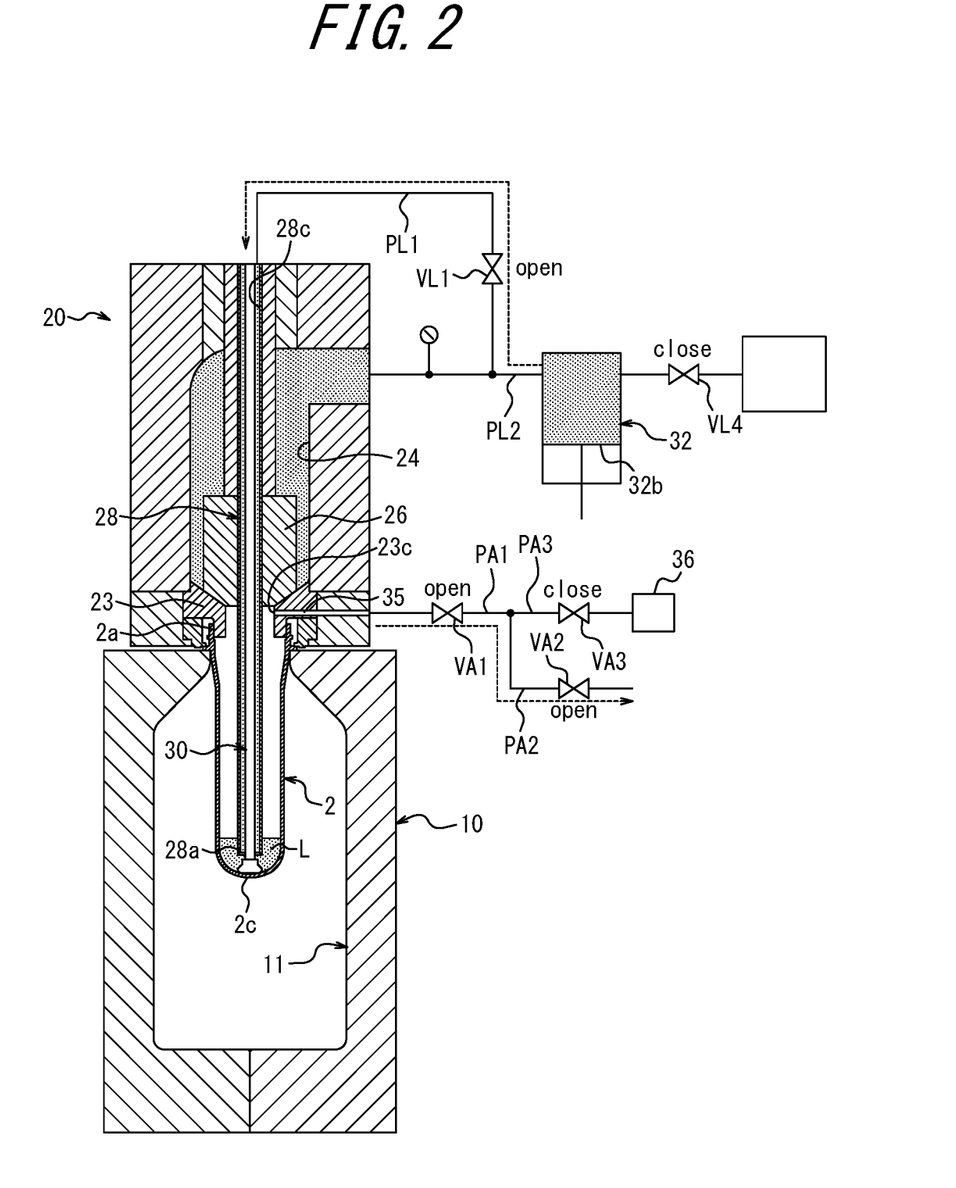
FIG. 2 is a diagram illustrating the liquid container manufacturing apparatus during an air exhausting step.
Figure 4:
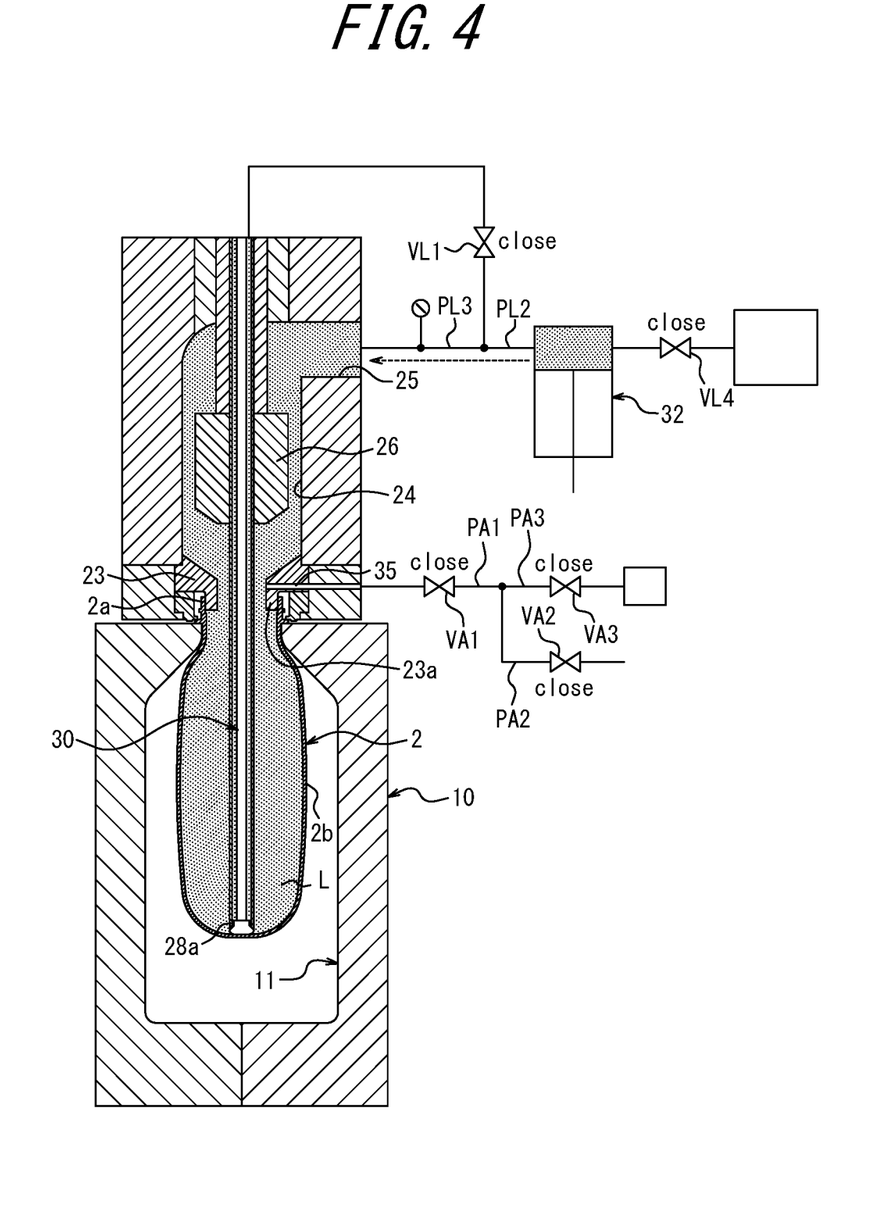
FIG. 4 is a diagram illustrating the liquid container manufacturing apparatus during a liquid blow molding step and a rod stretching step.
Figure 7:
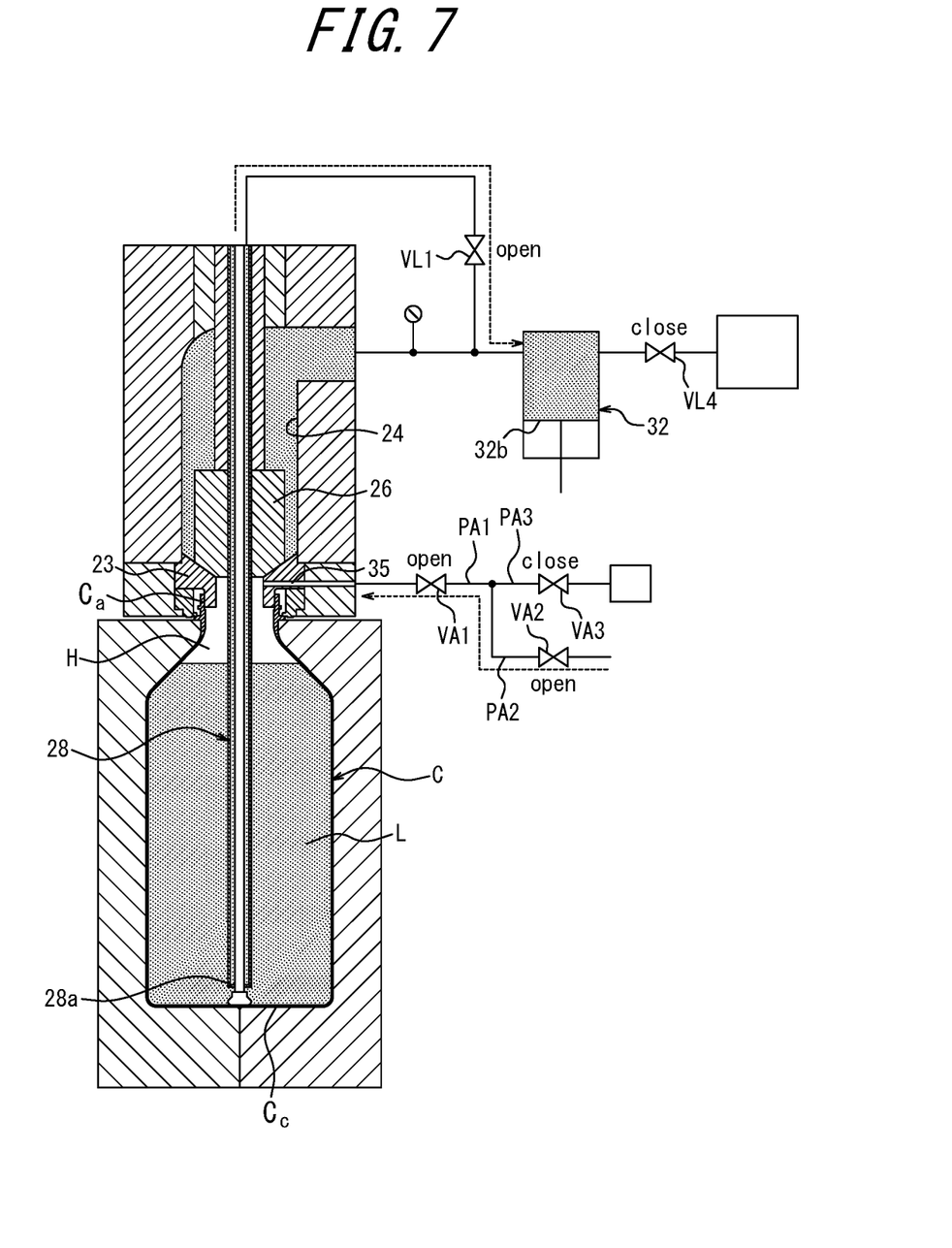
FIG. 7 is a diagram illustrating the liquid container manufacturing apparatus during a headspace forming step (air introducing step)

The state of the air passage configured by the exhaust passage 35 and the first to third air pipes PA1 to PA3 can be switched among the releasing to the atmosphere state illustrated in FIGS. 2 and 7, the closing state illustrated in FIG. 4 and the sucking state illustrated in FIG. 1 by opening/closing the first to third air valves VA1 to VA3. That is, the air passage is released to the atmosphere by opening the first and second air pipe valves VA1 and VA2 and closing the third air pipe valve VA3. Further, the air passage is closed by closing the first to third air pipe valves VA1 to VA3. The air passage is put in the sucking state by opening the first and third air pipe valves VA1 and VA3 and closing the second air pipe valve VA2.

As illustrated in FIG. 1, when the air passage is put in the sucking state, dripping of the liquid remained below the seal surface 23b of the blow nozzle 23 can be prevented. If the liquid L does not easily drip, or dripping is not a problem, it is not necessary to put the air passage in the sucking state, and the third air pipe PA3 and the suction source 36 may not be provided.

As illustrated in FIG. 2, in a state where the blow nozzle 23 is hermetically engaged with the mouth portion 2a of the preform 2 placed in the mold 10 and the seal body 26 closes the longitudinal channel 24, when the spare supply port 28a of the spare supply tube 28 is opened at the bottom portion 2c of the preform 2 and the pressurized liquid supply source 32 is operated in the positive direction (pressurizing direction), the liquid L can be supplied into the preform 2 from the pressurized liquid supply source 32 through the second liquid pipe PL2, the first liquid pipe PL1, the intra-tube channel 28c and the spare supply port 28a. In this case, the fourth liquid pipe valve VL4 is closed, the first liquid pipe valve VL1 is opened and the air passage is released to the atmosphere. When the air passage is released to the atmosphere, the air inside the preform 2 is exhausted to the atmosphere through the air passage while the liquid L is supplied into the preform 2. It is to be noted that, instead of releasing the air passage to the atmosphere to exhaust the air, the air passage may be put in the sucking state. In this case, suction of the air from the inside of the preform 2 may be started before, at the same time of, or during supply of the liquid L into the preform 2.

As illustrated in FIG. 4, in a state where the blow nozzle 23 is hermetically engaged with the mouth portion 2a of the preform 2 placed in the mold 10 and the longitudinal channel 24 is opened by the seal body 26, when the pressurized liquid supply source 32 is operated in the positive direction, a pressurized liquid L can be supplied into the preform 2 through the second liquid pipe PL2, the third liquid pipe PL3, the supply port 25 and the longitudinal channel 24. In this case, the fourth liquid pipe valve VL4 is closed, the first liquid pipe valve VL1 is closed, the spare supply port 28a is closed and the air passage is closed. When a pressurized liquid L is supplied as described above, the preform 2 can be molded into a liquid container C of a shape conforming to the cavity 11 of the mold 10.

Figure 6:
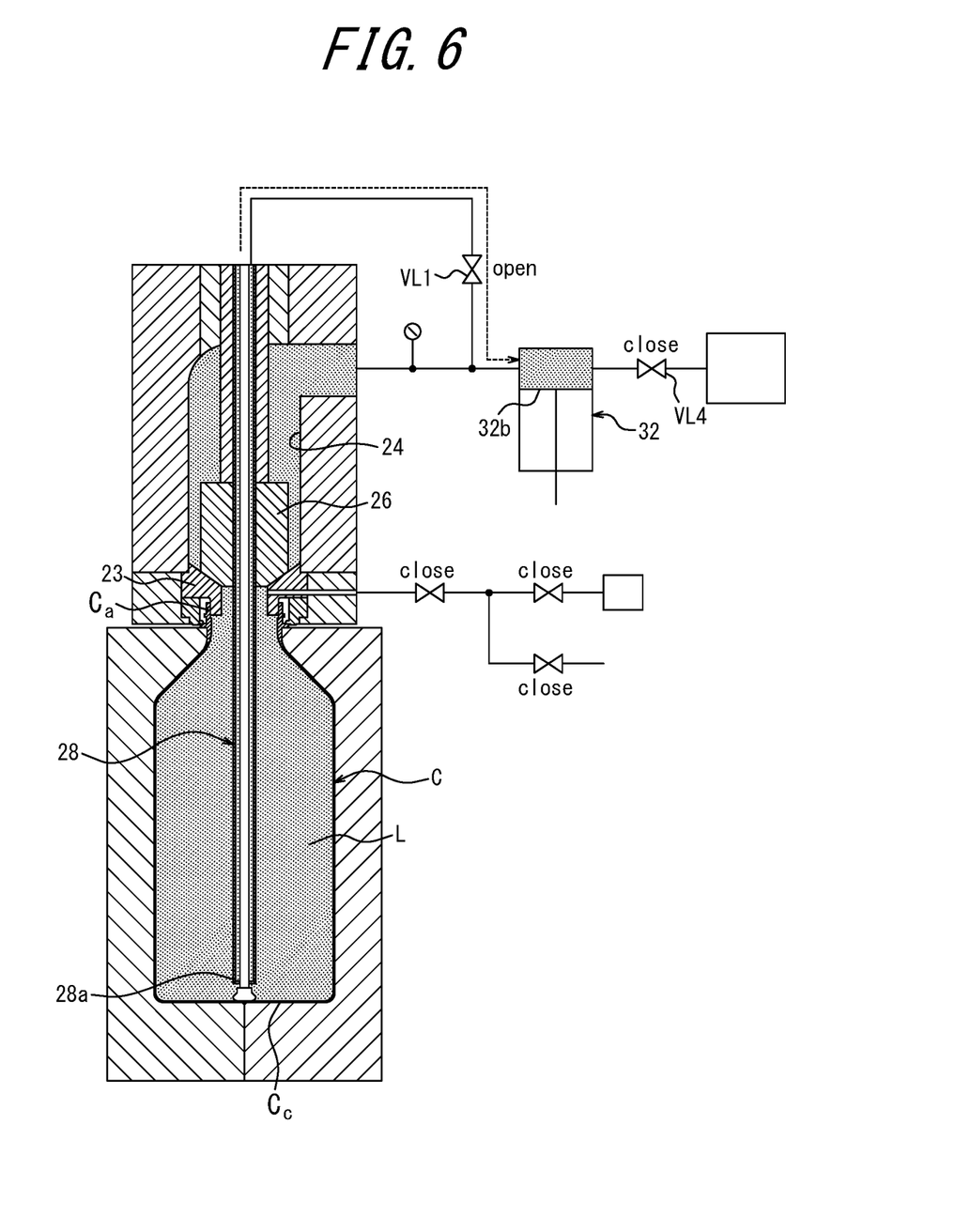
FIG. 6 is a diagram illustrating the liquid container manufacturing apparatus during a headspace forming step (depressurizing step)

As illustrated in FIGS. 6 and 7, in a state where the blow nozzle 23 is hermetically engaged with the mouth portion Ca of the liquid container C and the longitudinal channel 24 is closed by the seal body 26, when the spare supply port 28a of the spare supply tube 28 is opened at the bottom portion Cc of the liquid container C and the pressurized liquid supply source 32 is operated in the reverse direction (sucking direction), the liquid L inside the liquid container C can be exhausted from the spare supply port 28a toward the pressurized liquid supply source 32. In this case, the fourth liquid pipe valve VL4 is closed and the first liquid pipe valve VL1 is opened. Further, the air passage is closed as illustrated in FIG. 6 until the positive pressure state in the liquid container C is solved by exhausting the liquid L as described above, and entering of the liquid L into the air passage is suppressed. Subsequently, the air passage is put in the releasing to the atmosphere state as illustrated in FIG. 7. In this manner, the air is introduced as the pressure inside the liquid container C is reduced, and a headspace H is formed while the liquid container C is prevented from being deformed. It is to be noted that, discharge of the liquid L through the spare supply port 28a may be promoted or supported by providing a pressurized air supply source to the air passage and by supplying pressurized air into the preform 2 with a pressure of a degree at which mixing of the air into the spare supply port 28a can be prevented.

Operation of the nozzle unit main body 20a, the seal body 26, the spare supply tube 28, the spare supply rod 30, the pressurized liquid supply source 32 (plunger 32b), the first liquid pipe valve VL1, the fourth liquid pipe valve VL4, the first to third air pipe valves VA1 to VA3 and the suction source 36 are integrally controlled by the above described control means not illustrated.

Next, a method of molding a liquid container C of a predetermined shape containing therein a liquid (content liquid) L from a synthetic resin preform 2 by using the liquid container manufacturing apparatus 1 configured in the above described manner (a method of manufacturing a liquid container according to this embodiment) will be described.

First, a standby step is performed. In the standby step, the nozzle unit 20 is located at a position separating upward with respect to the mold 10 as illustrated in FIG. 1, the seal body 26 closes the longitudinal channel 24, and the spare seal body 29 of the spare supply rod 30 closes the spare supply port 28a of the spare supply tube 28. Further, the air passage is in a sucking state.

In the standby step, the preform 2 is placed in the mold 10 and is clamped, the preform 2 having been preheated, by using a heating means (not illustrated) such as a heater, to a predetermined temperature (e.g. from 80° C. to 150° C.) at which stretchability is achieved. At this time, since the mouth portion 2a of the preform 2 is opened, the preform 2 is in a state where the inside thereof is filled with the air.

Figure 3:
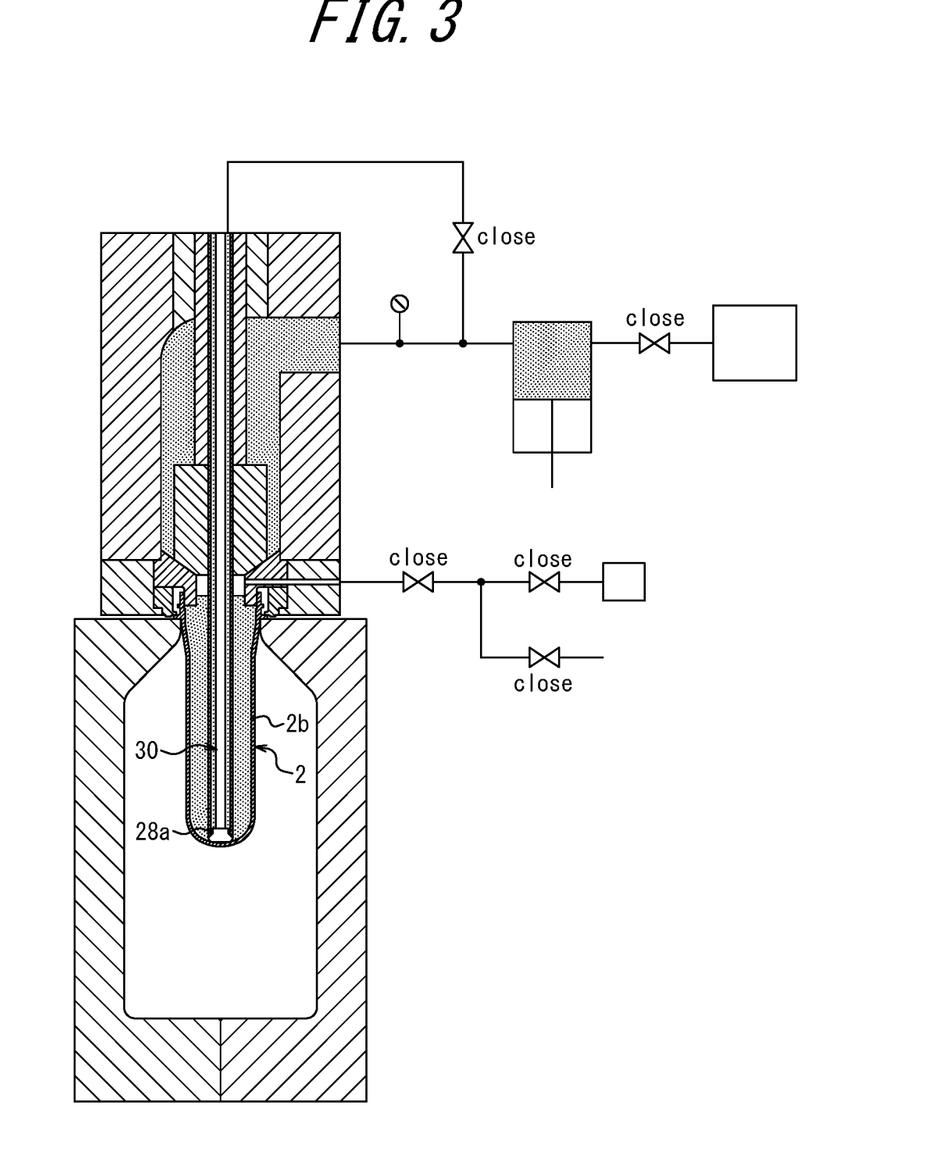
FIG. 3 is a diagram illustrating the liquid container manufacturing apparatus when the air exhausting step is completed.

Next, in this embodiment, the air exhausting step is performed. In the air exhausting step, as illustrated in FIG. 2, the nozzle unit 20 is lowered and the blow nozzle 23 is engaged with the mouth portion 2a of the preform 2 so that the air passage is put in the releasing to the atmosphere state. Then, while the longitudinal channel 24 is closed with the seal body 26, the spare supply tube 28 and the spare seal body 29 are lowered and the spare supply port 28a is opened at the bottom portion 2c of the preform 2. In this state, the plunger 32b is operated in the positive direction at a first speed (that is, a first pressure), and the liquid L is supplied into the preform 2 from the spare supply port 28a. In this manner the air inside the preform 2 is exhausted to the atmosphere (outside) through the air passage. That is, when the liquid L is supplied into the preform 2, most of the air filled in the preform 2 is pushed out and exhausted by the liquid L to the outside. The spare supply port 28a is opened, specifically, when the spare supply tube 28 rises with respect to the spare seal body 29 in a state where the spare seal body 29 comes in contact with or comes close to the bottom portion 2c. When the exhaust of the air is completed, as illustrated in FIG. 3, the spare supply port 28a is closed, and the air passage is closed. It is to be noted that, instead of exhausting the air through the air passage, an exhaust passage of the air may be secured by not engaging the blow nozzle 23 with the mouth portion 2a of the preform 2. Preferably, the first speed in the air exhausting step is set to a degree with which the preform is not substantially stretched (expanded).

In this manner, in the air exhausting step, instead of supplying the liquid L by opening the longitudinal channel 24 with the seal body 26, the liquid L is supplied from the spare supply port 28a of the spare supply tube 28. In this manner, the liquid L is prevented from entering into the exhaust port 23c provided in the inner periphery of the blow nozzle 23, and the air can be smoothly exhausted from the inside of the preform 2 through the air passage. Further, in the air exhausting step, when the liquid L is supplied with the spare supply port 28a located at the bottom portion 2c of the preform 2, the spare supply port 28a is immersed in the liquid immediately after the liquid L is supplied, and in that state the liquid L can be supplied. In this manner, entrainment of the air, which may cause bubbling of the liquid L filled in the preform 2, can be effectively suppressed. When entrainment of the air is suppressed, the air is prevented from mixing into the liquid L in the liquid container C formed in the liquid blow molding step, and as a result a headspace H of a desired size can be formed stably in the headspace forming step. Further, when entrainment of the air is suppressed, the amount of air bubbles contained in the liquid L that is returned to the inside of the nozzle unit 20 in the headspace forming step is reduced, thus mixing of the air into the supply channel is also prevented. In this manner, stability of the molding conditions and moldability of a container can be improved.

Figure 5:
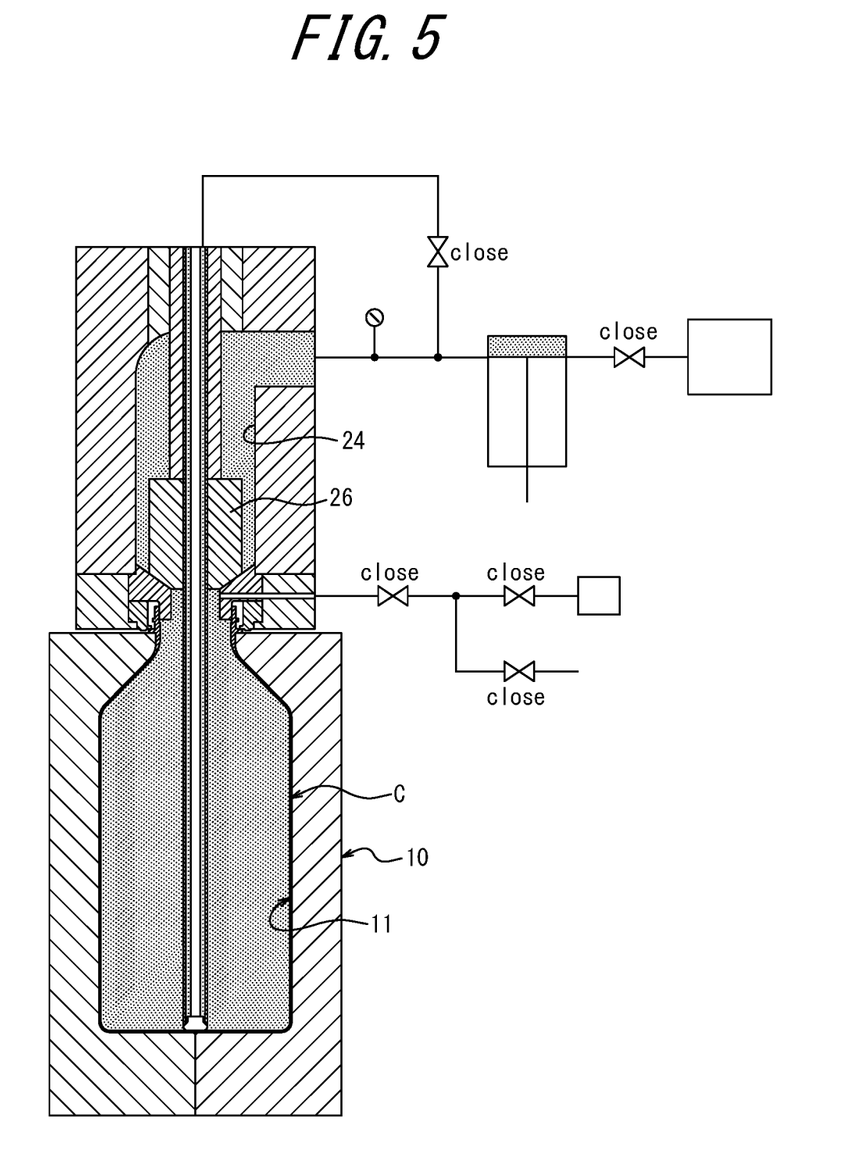
FIG. 5 is a diagram illustrating the liquid container manufacturing apparatus when the liquid blow molding step and the rod stretching step are completed.

When the air exhausting step is completed, next, the liquid blow molding step is performed. In the liquid blow molding step, as illustrated in FIG. 4, the longitudinal channel 24 is opened with the seal body 26 while the blow nozzle 23 is engaged with the mouth portion 2a of the preform 2, and a liquid L pressurized to a second pressure that is larger than the first pressure by the pressurized liquid supply source 32 is supplied into the preform 2 from the supply port 23a. In this manner, the preform 2 is molded into a liquid container C of a shape conforming to the cavity 11 of the mold 10, as illustrated in FIG. 5. After the liquid container C is molded in the above described manner, the longitudinal channel 24 is closed with the seal body 26, and the liquid blow molding step is completed. It is to be noted that, in this embodiment, although the spare supply port 28a is closed in the liquid blow molding step, it may be opened so as to supply the liquid L also from the spare supply port 28a.

In this embodiment, as illustrated in FIGS. 3 and 4, the rod stretching step is performed during the liquid blow molding step. In the rod stretching step, the body portion 2b of the preform 2 is stretched in the axial direction (longitudinal direction) by the spare supply tube 28 and the spare supply rod 30 (stretching rod) that are displaced downward. In this embodiment, the spare supply tube 28 and the spare supply rod 30 are lowered together with the spare supply port 28a closed. The rod stretching step may be performed before the liquid blow molding step. When the liquid blow molding step is performed after or during the rod stretching step (the rod stretching step may be started after the liquid blow molding step is started), a biaxial stretch blow molding can be performed, in which a blow molding is performed while the preform 2 is axially stretched by the stretching rod. Thus, the preform 2 can be molded into a liquid container C of a predetermined shape more precisely. However, the liquid blow molding step may be performed without performing the rod stretching step. In FIG. 1, the spare supply tube 28 and the spare supply rod 30 are located at their original positions. At the original positions, the lower ends of the spare supply tube 28 and the spare supply rod 30 are not needed to be located at the height illustrated in FIG. 1, and may be located above or below that height.

The liquid blow molding step is performed in a state where most of the air in the preform 2 is exhausted to the outside in the air exhausting step. Thus, when a pressurized liquid L is supplied into the preform 2, the liquid L does not entrain the air. In this manner, mixing of the air into the liquid L in the liquid container C can be prevented.

When the liquid blow molding step is completed, next, the headspace forming step is performed. As illustrated in FIGS. 6 and 7, according to this embodiment, in the headspace forming step, a headspace H of a desired size is formed in the liquid container C by suck back in which a liquid L is exhausted from the inside of the liquid container C by operating the pressurized liquid supply source 32 in the sucking direction. It is to be noted that, instead of the above described suck back, a headspace H may be formed by exhausting a liquid L from the inside of the liquid container C by means such as pushing the liquid container C from outside.

According to this embodiment, in the headspace forming step, first, a depressurizing step is performed, in which a liquid L is exhausted from the inside of the liquid container C with the air passage closed as illustrated in FIG. 6. In the depressurizing step, the seal body 26 closes the longitudinal channel 24, the air passage is closed, and the spare supply port 28a is located at the bottom portion Cc of the liquid container C. In this state, the spare supply port 28a and the first liquid pipe valve VL1 are opened, and the plunger 32b of the pressurized liquid supply source 32 is operated in the sucking direction to suck back the liquid L from the inside of the liquid container C toward the pressurized liquid supply source 32 through the spare supply port 28a. The positive pressure state inside the liquid container C is dissolved (or the liquid container C may be put in a negative pressure state) by the depressurizing step, and when the air passage is released to the atmosphere after that, the liquid L is prevented from entering into the air passage from the inside of the liquid container C. It is to be noted that, the depressurizing step may be performed, in addition to or instead of opening the spare supply port 28a, by opening the longitudinal channel 24 with the seal body 26. The depressurizing step may not be performed.

According to this embodiment, in the headspace forming step, when the depressurizing step is completed, as illustrated in FIG. 7, an air introducing step is performed in which the air is introduced into the liquid container C by exhausting the liquid L from the inside of the liquid container C through the spare supply port 28a with the air passage released to the atmosphere. In the air introducing step, the plunger 32b of the pressurized liquid supply source 32 is operated in the sucking direction with the longitudinal channel 24 closed with the seal body 26, the air passage released to the atmosphere, the spare supply port 28a located at the bottom portion Cc of the liquid container C and the spare supply port 28a and the first liquid pipe valve VL1 open. Then the liquid L is sucked back from the inside of the liquid container C toward the pressurized liquid supply source 32 through the spare supply port 28a. When the liquid L is exhausted while the air is introduced as described above, a larger headspace H can be formed without causing deformation (permanent deformation) of the liquid container C due to excess negative pressure. However, a headspace H may be formed by releasing to the atmosphere after performing suck back without introducing the air so as to put the inside of the liquid container C in a negative pressure state.

According to this embodiment, in the headspace forming step (the depressurizing step and the air introducing step), the liquid L is exhausted from the inside of the liquid container C through the spare supply port 28a located at the bottom portion Cc of the liquid container C, and a headspace H is formed in the liquid container C. In this manner, according to this embodiment, the liquid L is sucked out from the lower side (in the liquid) where less air is mixed, and thus a headspace H of a desired size can be stably formed. Entering of the air into the supply channel in the nozzle unit 20 can be also suppressed. However, the liquid L may be sucked out from the spare supply port 28a with the spare supply port 28a located above the bottom portion Cc of the liquid container C. Moreover, instead of or in addition to the spare supply port 28a, suck back may be performed through the longitudinal channel 24 by opening the longitudinal channel 24 with the seal body 26 to form a headspace H.

According to this embodiment, in the headspace forming step, the air is introduced into the liquid container C through the air passage. However, an air introduction passage may be secured by separating the blow nozzle 23 from the mouth portion Ca of the liquid container C.

Figure 8:
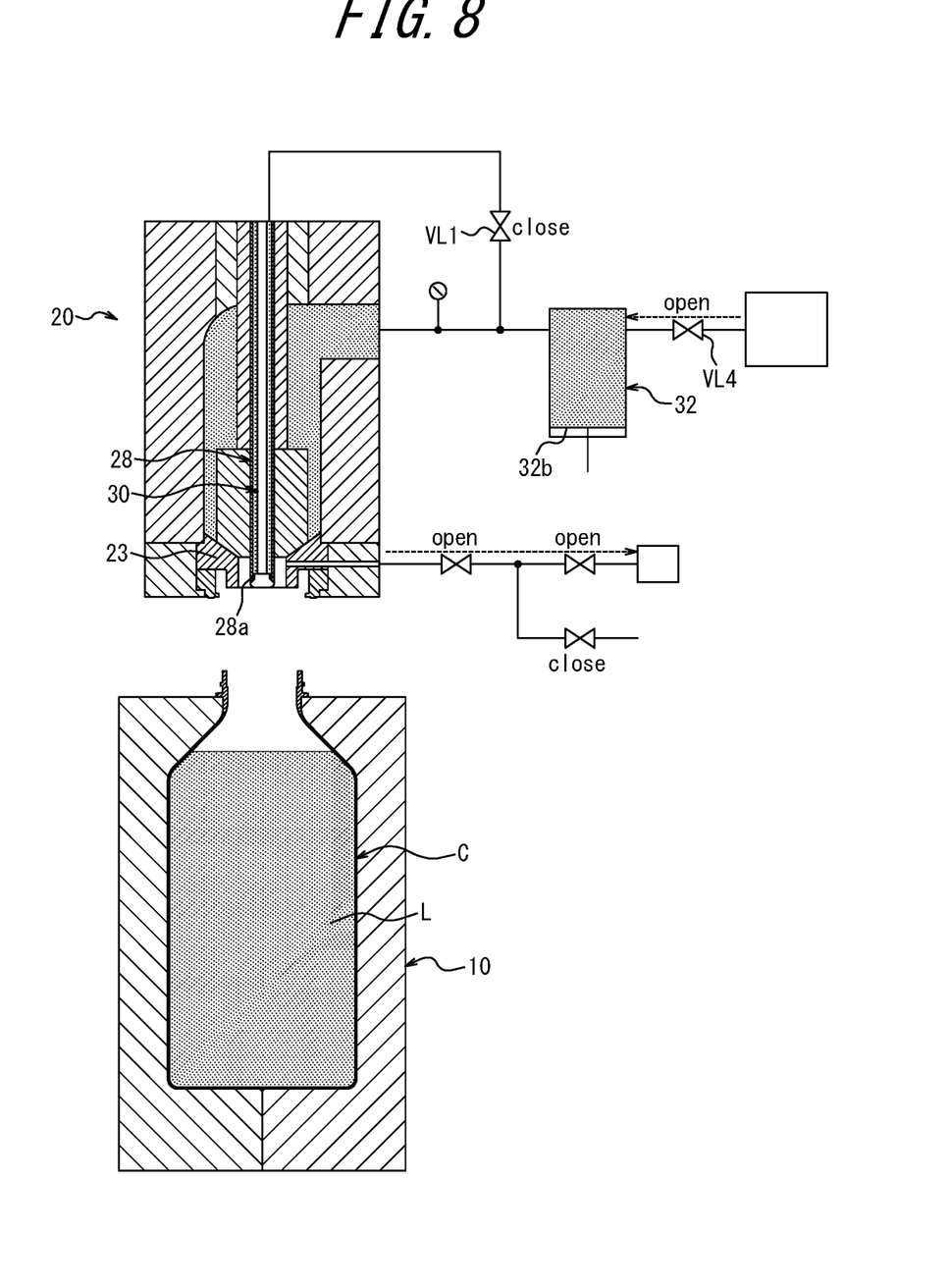
FIG. 8 is a diagram illustrating the liquid container manufacturing apparatus when the headspace forming step is completed.

According to this embodiment, when the headspace forming step is completed, a rod rising/sucking step is performed. In the rod rising/sucking step, as illustrated in FIG. 8, the spare supply port 28a and the first liquid pipe valve VL1 are closed, and the spare supply tube 28 and the spare supply rod 30 are risen and returned to their original positions. Further, the air passage is put in a sucking state to prevent the liquid from dripping from the blow nozzle 23. Next, the nozzle unit 20 is risen to open the fourth liquid pipe valve VL4, and the plunger 32b of the pressurized liquid supply source 32 is operated in the sucking direction to fill the pressurized liquid supply source 32. After that the liquid container C is ejected from the mold 10, and the step proceeds to the standby step illustrated in FIG. 1.

The present disclosure is not limited to the above described embodiment, and it is needless to say that various modifications may be made without departing from the spirit of the present disclosure.

For example, in the above described embodiment, although the disclosed method of manufacturing a liquid container is performed by using the liquid container manufacturing apparatus 1 illustrated in FIG. 1, the disclosed method of manufacturing a liquid container may be performed by using a liquid container manufacturing apparatus of other configurations.

In the above described embodiment, the pressurized liquid supply source 32 is a plunger pump, but it is not limited thereto, and other types of pumps and the like may be used as long as the liquid L is pressurized to a predetermined pressure and is supplied into the preform 2, and a negative pressure can be generated for sucking back the liquid L.

In the above described embodiment, the liquid L is exhausted from the inside of the liquid container C in the headspace forming step to form a headspace H in the liquid container C. However, a headspace H may be formed in the liquid container C by pulling out the stretching rod, not by exhausting the liquid L from the inside of the liquid container C in the headspace forming step.

A preform 2 having a variety of shapes can be used depending on the shape and the like of the liquid container C after molding.

REFERENCE SIGNS LIST

1 Liquid container manufacturing apparatus
2 Preform
2a Mouth portion
2b Body portion
2c Bottom portion
10 Mold
11 Cavity
20 Nozzle unit
20a Nozzle unit main body
21 Main body block
22 Support block
23 Blow nozzle
23a Supply port
23b Seal surface
23c Exhaust port
24 Longitudinal channel
25 Supply port
26 Seal body
26a Tapered surface
27 Shaft body
28 Spare supply tube
28a Spare supply port
28b Spare seal surface
28c Intra-tube channel
29 Spare seal body
29a Fixing portion
29b Flange
29c Spare tapered surface
30 Spare supply rod
31 Rod shaft body
32 Pressurized liquid supply source
32a Cylinder
32b Piston
33 Pressure gauge
34 Tank
35 Exhaust passage
36 Suction source
C Liquid container
Ca Mouth portion
Cc Bottom portion
L Liquid (content liquid)
PL1 to PL4 First to fourth liquid pipes
PA1 to PA3 First to third air pipes
VL1 First liquid pipe valve
VL4 Fourth liquid pipe valve
VA1 to VA3 First to third air pipe valves
H Headspace

The invention claimed is:

1. A method of manufacturing a liquid container containing a content liquid from a preform of a bottomed tubular shape by using a nozzle unit and a mold, wherein:
   the nozzle unit includes:
      a blow nozzle having a liquid supply port; and
      a spare supply tube having, at a lower end thereof, a spare supply port, and the method comprises:
   an air exhausting step of exhausting the air inside the preform to an outside by supplying a liquid into the preform from the spare supply port located at a bottom portion of the preform;
   a liquid blow molding step of molding the preform into the liquid container of a shape conforming to an inner surface of the mold by supplying a pressurized liquid from the supply port into the preform; and
   a headspace forming step of forming a headspace in the liquid container by exhausting a liquid from the inside of the liquid container.

2. The method of manufacturing a liquid container according to claim 1, wherein, in the headspace forming step, a headspace is formed in the liquid container by exhausting a liquid from the inside of the liquid container through the spare supply port located at the bottom portion of the liquid container.

3. The method of manufacturing a liquid container according to claim 2, wherein,
   the nozzle unit includes:
      a seal body configured to open/close a supply channel terminated at the supply port; and
      a spare seal body configured to open/close the spare supply port;
   the spare supply tube passes through the seal body and is displaceable relative to the seal body;
   the air exhausting step is performed with the supply channel closed with the seal body;
   the liquid blow molding step is performed with the supply channel opened with the seal body; and
   the headspace forming step is performed with the supply channel closed with the seal body.

4. The method of manufacturing a liquid container according to claim 3, wherein
   a stretching rod is configured by the spare supply tube and the spare seal body; and
   the method further comprises a rod stretching step of axially stretching the preform by the stretching rod with the spare supply port closed during or before the liquid blow molding step.

5. The method of manufacturing a liquid container according to claim 4, wherein,
the nozzle unit has a pressurized liquid supply source connected to both of the supply port and the spare supply port;
the air exhausting step is performed by operating the pressurized liquid supply source in a pressurizing direction;
the liquid blow molding step is performed by operating the pressurized liquid supply source in the pressurizing direction; and
the headspace forming step is performed by operating the pressurized liquid supply source in a sucking direction.

6. The method of manufacturing a liquid container according to claim 3, wherein,
the nozzle unit has a pressurized liquid supply source connected to both of the supply port and the spare supply port;
the air exhausting step is performed by operating the pressurized liquid supply source in a pressurizing direction;
the liquid blow molding step is performed by operating the pressurized liquid supply source in the pressurizing direction; and
the headspace forming step is performed by operating the pressurized liquid supply source in a sucking direction.

7. The method of manufacturing a liquid container according to claim 2, wherein,
the nozzle unit has a pressurized liquid supply source connected to both of the supply port and the spare supply port;
the air exhausting step is performed by operating the pressurized liquid supply source in a pressurizing direction;
the liquid blow molding step is performed by operating the pressurized liquid supply source in the pressurizing direction; and
the headspace forming step is performed by operating the pressurized liquid supply source in a sucking direction.

8. The method of manufacturing a liquid container according to claim 1, wherein,
the nozzle unit includes:
a seal body configured to open/close a supply channel terminated at the supply port; and
a spare seal body configured to open/close the spare supply port;
the spare supply tube passes through the seal body and is displaceable relative to the seal body;
the air exhausting step is performed with the supply channel closed with the seal body;
the liquid blow molding step is performed with the supply channel opened with the seal body; and
the headspace forming step is performed with the supply channel closed with the seal body.

9. The method of manufacturing a liquid container according to claim 8, wherein
a stretching rod is configured by the spare supply tube and the spare seal body; and
the method further comprises a rod stretching step of axially stretching the preform by the stretching rod with the spare supply port closed during or before the liquid blow molding step.

10. The method of manufacturing a liquid container according to claim 9, wherein,
the nozzle unit has a pressurized liquid supply source connected to both of the supply port and the spare supply port;
the air exhausting step is performed by operating the pressurized liquid supply source in a pressurizing direction;
the liquid blow molding step is performed by operating the pressurized liquid supply source in the pressurizing direction; and
the headspace forming step is performed by operating the pressurized liquid supply source in a sucking direction.

11. The method of manufacturing a liquid container according to claim 8, wherein,
the nozzle unit has a pressurized liquid supply source connected to both of the supply port and the spare supply port;
the air exhausting step is performed by operating the pressurized liquid supply source in a pressurizing direction;
the liquid blow molding step is performed by operating the pressurized liquid supply source in the pressurizing direction; and
the headspace forming step is performed by operating the pressurized liquid supply source in a sucking direction.

12. The method of manufacturing a liquid container according to claim 1, wherein,
the nozzle unit has a pressurized liquid supply source connected to both of the supply port and the spare supply port;
the air exhausting step is performed by operating the pressurized liquid supply source in a pressurizing direction;
the liquid blow molding step is performed by operating the pressurized liquid supply source in the pressurizing direction; and
the headspace forming step is performed by operating the pressurized liquid supply source in a sucking direction.

* * * * *